(12) United States Patent
Khanduja (10) Patent No.: US 10,146,936 B1
(45) Date of Patent: *Dec. 4, 2018

(54) INTRUSION DETECTION FOR STORAGE RESOURCES PROVISIONED TO CONTAINERS IN MULTI-TENANT ENVIRONMENTS

(71) Applicant: EMC Corporation, Hopkinton, MA (US)

(72) Inventor: Vaibhav Khanduja, Cupertino, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 411 days.

This patent is subject to a terminal disclaimer.

(21) Appl. No.: 14/939,562

(22) Filed: Nov. 12, 2015

(51) Int. Cl.
  *G06F 12/00* (2006.01)
  *G06F 13/00* (2006.01)
  (Continued)

(52) U.S. Cl.
  CPC ........ *G06F 21/552* (2013.01); *G06F 9/45504* (2013.01); *G06F 9/45533* (2013.01);
  (Continued)

(58) Field of Classification Search
  CPC ... H04L 67/1097; G06F 3/062; G06F 3/0622; G06F 3/0665; G06F 9/455;
  (Continued)

(56) References Cited

U.S. PATENT DOCUMENTS 6,453,392 B1 * 9/2002 Flynn, Jr. .............. G06F 3/0619
    409/104
8,082,362 B1 * 12/2011 Ewing ................... G06F 17/302
    370/241

(Continued)

FOREIGN PATENT DOCUMENTS

| CN | 103810046 A | 5/2014 |
| CN | 103870314 A | 6/2014 |
| CN | 104104513 A | 10/2014 |

OTHER PUBLICATIONS

A. Gulati et al., "mClock: Handling Throughput Variability for Hypervisor IO Scheduling," USENIX Symposium on Operating Systems Design and Implementation (OSDI), https://labs.vmware.com/academic/publications/mclock, Oct. 2010, 14 pages.

(Continued)

*Primary Examiner* — Linglan E Edwards
(74) *Attorney, Agent, or Firm* — Ryan, Mason & Lewis, LLP (57) ABSTRACT

An apparatus comprises at least one container host device implementing containers for respective tenants of a multi-tenant environment, a storage platform coupled to the container host device and implementing storage resources for utilization by the containers, a container storage controller associated with the container host device, and a storage intrusion detector. The container storage controller is configured to provision portions of the storage resources for respective ones of the containers including for each of the containers at least one storage volume. The storage intrusion (Continued)

detector is configured to detect a condition under which a process not associated with a given one of the containers attempts to access the storage volume provisioned for that container. An alert is generated responsive to the detected condition. The storage intrusion detector may comprise a monitoring component that interacts with a kernel module implemented in kernel space of the container host device operating system.

20 Claims, 7 Drawing Sheets

(51) Int. Cl.
*G06F 21/55* (2013.01)
*G06F 12/14* (2006.01)
*G06F 9/455* (2018.01)

(52) U.S. Cl.
CPC ...... *G06F 9/45558* (2013.01); *G06F 12/1458* (2013.01); *G06F 2009/45583* (2013.01); *G06F 2009/45587* (2013.01); *G06F 2212/1052* (2013.01); *G06F 2221/034* (2013.01)

(58) Field of Classification Search
CPC ............. G06F 9/45504; G06F 9/45533; G06F 9/45558; G06F 2009/45583; G06F 2009/45587
See application file for complete search history.

(56) References Cited

U.S. PATENT DOCUMENTS

| | | | |
|---|---|---|---|
| 8,417,747 B1 | 4/2013 | Hayden et al. | |
| 8,868,530 B1* | 10/2014 | Thoppal | G06F 3/0622 707/704 |
| 8,898,402 B1* | 11/2014 | Stronge | G06F 3/0605 711/100 |
| 8,972,978 B2* | 3/2015 | Astete | G06F 9/45533 718/1 |
| 9,501,245 B2* | 11/2016 | Hussain | G06F 3/0664 |
| 2008/0256607 A1 | 10/2008 | Janedittakarn et al. | |
| 2008/0279207 A1* | 11/2008 | Jones | H04L 47/20 370/412 |
| 2010/0138830 A1* | 6/2010 | Astete | G06F 9/45533 718/1 |
| 2012/0173488 A1 | 7/2012 | Spielberg et al. | |
| 2012/0174113 A1 | 7/2012 | Pohlmann | |
| 2012/0180039 A1 | 7/2012 | Bravery et al. | |
| 2013/0145006 A1 | 6/2013 | Tammam | |
| 2014/0274408 A1 | 9/2014 | Dave | |
| 2014/0317618 A1 | 10/2014 | Behera et al. | |
| 2014/0366155 A1 | 12/2014 | Chang et al. | |
| 2015/0058861 A1 | 2/2015 | Zheng et al. | |
| 2015/0074058 A1 | 3/2015 | Zhao et al. | |
| 2015/0120928 A1 | 4/2015 | Gummaraju et al. | |
| 2015/0248357 A1* | 9/2015 | Kaplan | G06F 12/1408 713/193 |
| 2015/0256341 A1* | 9/2015 | Ye | H04L 41/0803 713/164 |
| 2015/0317088 A1* | 11/2015 | Hussain | G06F 3/0664 711/103 |
| 2016/0149950 A1* | 5/2016 | Ashley | G06F 9/45533 726/23 |

OTHER PUBLICATIONS sysdig.org, "Universal System Visibility with Native Container Support," 2015, 3 pages.
Encomium to Technology, "Dissecting Docker Security—Part 1," http://goo.gl/35Jr9D, Aug. 12, 2015, 3 pages.
Encomium to Technology, "Aesthetics of Linus Security Modules," http://goo.gl/x12gJD, Aug. 12, 2015, 3 pages.
Netlink, "Linux Programmer's Manual," http://man7.org/linux/man-pages/man7/netlink.7.html, Jan. 10, 2015, 7 pages.
U.S. Appl. No. 14/752,153 filed in the name of R. Wallner et al. filed Jun. 26, 2015 and entitled "Coordinated Resource Allocation Between Container Groups and Storage Groups."
U.S. Appl. No. 14/820,026 filed in the name of Vaibhav Khanduja et al. filed Aug. 6, 2015 and entitled "Provisioning Isolated Storage Resource Portions for Respective Containers in Multi-Tenant Environments."

* cited by examiner

INTRUSION DETECTION FOR STORAGE RESOURCES PROVISIONED TO CONTAINERS IN MULTI-TENANT ENVIRONMENTS

FIELD

The field relates generally to information processing systems, and more particularly to storage resources in information processing systems.

BACKGROUND

Information processing systems increasingly utilize reconfigurable virtual resources to meet changing user needs in an efficient, flexible and cost-effective manner. For example, cloud computing and storage systems implemented using virtual machines have been widely adopted. Alternative virtual resources now coming into use in information processing systems include Linux containers. Such containers may be used to provide at least a portion of the virtualization infrastructure of a given information processing system. However, significant challenges arise in deployment of containers in multi-tenant environments. For example, in such environments it can be difficult to isolate storage resources utilized by a container of one tenant from the storage resources utilized by containers of other tenants.

SUMMARY

Illustrative embodiments provide techniques for intrusion detection for storage resources provisioned to containers in a multi-tenant environment. For example, such arrangements can facilitate the effective determination of conditions under which a process not associated with a given one of the containers attempts to access a storage volume that has been provisioned for that container.

In one embodiment, an apparatus comprises at least one container host device implementing containers for respective tenants of a multi-tenant environment. The apparatus further comprises a storage platform coupled to the container host device and implementing storage resources for utilization by the containers, a container storage controller associated with the container host device, and a storage intrusion detector. The container storage controller is configured to provision portions of the storage resources for respective ones of the containers including for each of the containers at least one storage volume. The storage intrusion detector is configured to detect a condition under which a process not associated with a given one of the containers attempts to access the storage volume provisioned for that container. An alert is generated responsive to the detected condition.

By way of example, the storage intrusion detector in some embodiments comprises a monitoring component implemented in user space of an operating system of the container host device, and a kernel module implemented in kernel space of the operating system of the container host device. The kernel module is configured to intercept system calls involving reading from or writing to the storage volume of the given container. The monitoring component compares an identifier of the given container to process identifiers associated with each of a plurality of intercepted system calls, and generates the alert if at least one of the process identifiers is inconsistent with the identifier of the given container.

Illustrative embodiments can facilitate the use of containers in multi-tenant environments by providing a mechanism through which each tenant can receive alerts when an unauthorized process attempts to access its provisioned storage volume. Such an arrangement can alleviate some of the difficulties associated with isolation of shared storage resources between multiple tenants, leading to improved security and performance in an information processing system comprising a multi-tenant storage environment.

These and other illustrative embodiments described herein include, without limitation, methods, apparatus, systems, and processor-readable storage media.

DETAILED DESCRIPTION

Illustrative embodiments of the present invention will be described herein with reference to exemplary information processing systems and associated host devices, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Such systems are considered examples of what are more generally referred to herein as multi-tenant environments.

Figure 1:
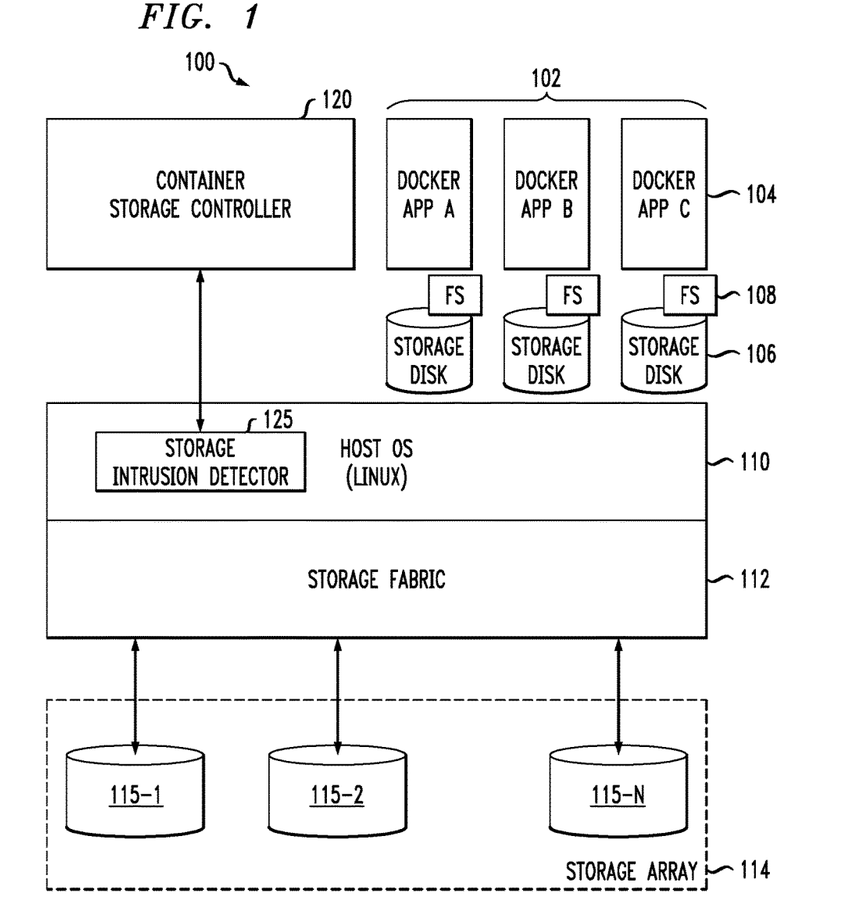
FIG. 1 shows an information processing system configured to provide storage intrusion detection for storage resources provisioned to tenant containers of a multi-tenant environment in an illustrative embodiment.

FIG. 1 shows an information processing system 100 configured in accordance with an illustrative embodiment. The system 100 comprises a plurality of containers 102 that are assumed to be implemented by at least one container host device. Each of the containers 102 comprises a corresponding application 104 that runs in that container, a storage disk 106, and an associated file system (FS) 108. The storage disks 106 are examples of what are more generally referred to herein as "storage volumes." The storage disks in some embodiments may comprise respective virtual disks. A wide variety of other types of physical or virtual storage volumes may be used in other embodiments.

The containers 102 are assumed to be associated with respective tenants of a multi-tenant environment of the system 100, although in other embodiments a given tenant can have multiple containers. It will also be assumed for further description below that a single container host device implements all of the containers 102 of the FIG. 1 embodiment, although other embodiments can include multiple container host devices. Each of these container host devices illustratively comprises at least one processor coupled to a memory. Such host devices are examples of what are more generally referred to herein as "processing devices."

The containers 102 of the system 100 are illustratively implemented as respective Docker containers, but one or more of the containers in other embodiments can comprise other types of containers, such as other types of Linux containers (LXCs). It is therefore to be appreciated that embodiments of the present invention are not restricted to use with Docker containers or any other particular type of containers. The containers 102 are assumed to be implemented on the above-noted container host device using Linux kernel control groups ("cgroups").

The containers 102 may be utilized to implement a variety of different types of functionality within the system 100. For example, such containers can be used to implement platform-as-a-service (PaaS) or infrastructure-as-a-service (IaaS) functionality in system 100, as well as microservices or converged infrastructure within a data center or other cloud computing and storage system. More particularly, in the present embodiment, the containers 102 comprise respective Docker containers running respective Docker applications denoted A, B and C, with each such container and its associated application corresponding to a different tenant of the multi-tenant environment of system 100.

The tenants associated with the respective containers 102 in the FIG. 1 embodiment are also referred to herein as tenants A, B and C. Accordingly, Docker application A is run in a container of tenant A, Docker application B is run in a container of tenant B, and Docker application C is run in a container of tenant C.

In other embodiments, processes other than applications 104 can be run in the containers 102. By way of example, containers can be used to implement respective portions of one or more cloud compute nodes of a cloud computing system. Such compute nodes may be associated with respective cloud tenants.

The container host device that implements the containers 102 in the FIG. 1 embodiment has a host operating system (OS) 110 that illustratively comprises a Linux operating system. The container host device is coupled to a storage platform that implements storage resources for utilization by the containers 102. The storage platform in this embodiment comprises a storage fabric 112 coupled to a storage array 114. The storage array 114 comprises a plurality of storage volumes denoted 115-1, 115-2, . . . 115-N. Other embodiments can implement other types of storage platforms, such as storage platforms comprising only a storage array, or storage platforms that use a storage fabric without a storage array. As noted above, storage resources of the storage platform comprising storage fabric 112 and storage array 114 are utilized by the containers 102 of the respective tenants A, B and C.

The term "storage platform" as used herein is intended to be broadly construed so as to encompass at least one storage array, at least one storage fabric or a combination of multiple instances of one or more of these and other types of storage devices and systems. For example, a given storage platform can comprise any of a variety of different types of storage including network-attached storage (NAS), storage area networks (SANs), direct-attached storage (DAS), distributed DAS and software-defined storage (SDS), as well as combinations of these and other storage types.

A given storage platform may comprise storage products such as VNX® and Symmetrix VMAX®, both commercially available from EMC Corporation of Hopkinton, Mass. Other types of storage products that can be used in implementing a given storage platform in an embodiment of the present invention include SDS products such as ScaleIO™, scale-out all-flash storage arrays such as XtremIO™, as well as scale-out NAS clusters comprising Isilon® platform nodes and associated accelerators in the S-Series, X-Series and NL-Series product lines, all commercially available from EMC Corporation.

The system 100 further comprises a container storage controller 120. In the present embodiment, at least a portion of the container storage controller 120 is assumed to be running as an application on the same container host device that implements the containers 102 for the respective tenants. By way of example, the container storage controller may run at least in part in its own container on the container host device, separate from the containers 102, although it need not run in a container.

The container storage controller 120 is configured to provision portions of the storage resources of the storage platform for respective ones of the containers 102. The provisioned portions of the storage resources of the storage platform include for each of the containers 102 at least one storage volume. The storage disks 106 are illustrative examples of storage volumes provisioned for respective ones of the containers 102, although other types of storage volumes, including physical or virtual storage volumes, or combinations thereof, can be provisioned for one or more of the containers 102 in other embodiments.

In some embodiments, the container storage controller 120 comprises a container storage orchestration tool, such as the Embers tool described in illustrative embodiments disclosed in U.S. patent application Ser. No. 14/820,026, filed Aug. 6, 2015 and entitled "Provisioning Isolated Storage Resource Portions for Respective Containers in Multi-Tenant Environments," which is commonly assigned herewith and incorporated by reference herein. Accordingly, storage intrusion detection functionality such as that described herein can be implemented in conjunction with related functionality of a container storage orchestration tool. It is to be appreciated, however, that embodiments of the present invention do not require any particular container storage orchestration tool functionality, such as the exemplary orchestration tool functionality associated with the Embers tool in illustrative embodiments of the above-cited U.S. patent application Ser. No. 14/820,026.

The container storage controller 120 is also configured to control starting and stopping of the containers 102, and to provide other functionality within the system 100 such as snapshotting and/or migration or other movement of the storage disks 106 of respective ones of the containers 102.

As a more particular example, the container storage controller 120 is illustratively configured to stop a given one of the containers, adjust its corresponding provisioned portion of the storage resources, and restart the given container with an updated storage disk 106 and associated file system 108 configured to reflect the adjusted provisioned portion of the storage resources.

It is assumed that that each of the storage disks 106 as well as other types of storage volumes have associated therewith a metadata mapping table or other suitable mapping functionality for translating logical addresses of data specified in input/output (I/O) operations directed to the storage volume to corresponding physical addresses in the underlying storage platform comprising storage fabric 112 and storage array 114. For example, any of a wide variety of address translation techniques can be used to support such mapping functionality. The mapping functionality can be provisioned, for example, in conjunction with provisioning of the corresponding storage disk or other storage volume under the control of the container storage controller 120.

In some embodiments, the container storage controller 120 can adjust the provisioned storage resources, for example, in order to accommodate potentially-conflicting storage demands of different tenants.

The container storage controller 120 can be configured to control the containers 102 via at least one Docker daemon. The Docker daemon is a tool provided by Docker to create containers using Linux cgroups and associated namespaces. The container storage controller 120 can communicate with the Docker daemon via at least one application programming interface (API) which may comprise a RESTful API possibly in combination with one or more additional APIs of other types. The container storage controller 120 can also interface to the storage platform via one or more APIs. One or more of the containers 102 can be started, stopped or otherwise controlled using the connecting Docker daemon through its RESTful API, which is illustratively a publically-available API.

As noted above, the container storage controller 120 manages the starting and stopping of the containers 102 as well as the provisioning and connection of their respective storage disks 106 and file systems 108. In conjunction with the starting or restarting of a given one of the containers 102, the container is connected with its corresponding one of the storage disks 106, for example, during an initialization portion of the container starting or restarting process. If the storage needs of the given container have changed since its last run, the container storage controller 120 can extend or shrink the size of the storage disk of the given container. For example, an existing virtual disk of the given container can be extended by daisy chaining a differencing virtual disk to a previously-provisioned virtual disk. In addition, protection functionality such as "cold" or "warm" snapshotting of the storage disk can be provided.

The container storage controller 120 is illustratively implemented as a dedicated application for provisioning storage resource portions to respective ones of the containers 102, possibly in accordance with respective storage manifests. The storage manifests may be specified at least in part by the applications associated with the respective containers. For example, the storage manifests may comprise storage resource requirement specifications for the respective containers.

The system 100 further comprises a storage intrusion detector 125, illustratively implemented in the host operating system 110. The storage intrusion detector 125 is configured to detect a condition under which a process not associated with a given one of the containers 102 attempts to access the storage volume 106 provisioned for that container. An alert is generated responsive to the detected condition. For example, such an alert may be generated by the storage intrusion detector 125 and provided to the container storage controller 120. Additionally or alternatively, alerts may be generated by the storage intrusion detector 125 and provided to other system components, such as to particular ones of the containers 102 for which storage intrusion conditions have been detected. The term "alert" as used herein in conjunction with detection of a storage intrusion is intended to be broadly construed, and may encompass, for example, information that is generated by the storage intrusion detector 125 responsive to a detected condition and utilized by another system component to prevent or otherwise alleviate the effects of an attempted unauthorized access.

Although illustrated in FIG. 1 as being implemented in the host operating system 110, at least portions of the storage intrusion detector 125 in other embodiments can be implemented in other system components. For example, an alert generator or other portion of the storage intrusion detector 125 can in some embodiments be implemented in the container storage controller 120, or alternatively as multiple alert generator instances implemented in respective ones of the containers 102. Accordingly, the storage intrusion detector 125 may be implemented at least in part within the container storage controller 120, or within other system components such as the containers 102. Numerous alternative storage intrusion detector configurations can be used in other embodiments.

In some embodiments, different portions of the storage intrusion detector 125 are implemented in user space and kernel space of the host operating system 110. For example, the storage intrusion detector 125 may comprise a monitoring component implemented in user space of the host operating system 110 and a kernel module implemented in kernel space of the host operating system 110.

The kernel module of the storage intrusion detector 125 is illustratively configured to intercept system calls involving reading from or writing to the storage volume 106 of a given one of the containers 102. The monitoring component compares an identifier of the given container to process identifiers associated with each of the intercepted system calls, and generates the alert if at least one of the process identifiers is inconsistent with the identifier of the given container. The kernel module in such an arrangement may be implemented at least in part in a system call interface of the kernel space of the host device operating system 110, although in other embodiments the kernel module may be implemented externally to the system call interface of the host device operating system 110.

The kernel module of the storage intrusion detector 125 is illustratively configured to populate information relating to the intercepted system calls into one or more data structures that are made accessible to the monitoring component. Such information relating to the intercepted system calls illustratively comprises the process identifier, one or more file names and a namespace identifier for each of the intercepted system calls. The monitoring component then determines if at least one of the process identifiers is inconsistent with the identifier of the given container by comparing a namespace identifier associated with the process identifier to a namespace identifier of the given container.

Additional examples of illustrative embodiments comprising a storage intrusion detector having a monitoring component and a kernel module will be described in more detail below in conjunction with FIGS. 4 through 7.

The storage intrusion detector 125 illustratively comprises different instances of detection functionality for different ones of the containers 102. The container storage controller 120 can be configured to start a storage intrusion detector instance for a given container in conjunction with the starting of that container.

The storage intrusion detector 125 and related system components provide a number of significant advantages that facilitate the sharing of storage resources between different tenants in a multi-tenant environment. For example, such arrangements can facilitate the effective determination of conditions under which a process not associated with a given one of the containers 102 attempts to access a storage volume 106 that has been provisioned for that container. The storage intrusion detector 125 provides a mechanism through which each tenant of the system 100 can receive alerts when an unauthorized process attempts to access its provisioned storage volume 106. These and other similar arrangements disclosed herein alleviate some of the difficulties associated with isolation of shared storage resources between multiple tenants, leading to improved security and performance in an information processing system comprising a multi-tenant storage environment.

Although shown as being separate from the storage platform in the FIG. 1 embodiment, one or both of the container storage controller 120 and the storage intrusion detector 125 can in some embodiments be implemented at least in part within the storage platform, or on at least one processing device that implements at least a portion of the storage platform. Numerous other arrangements of processing devices can be used to implement the containers 102, container storage controller 120, storage intrusion detector 125, and associated container host device and storage platform elements.

Accordingly, it is to be appreciated that the particular arrangement of system elements shown in FIG. 1 is for purposes of illustration only. Numerous alternative system configurations, involving other arrangements of additional or alternative elements, can therefore be used to implement storage intrusion detection for storage resources provisioned to different containers of respective tenants in a multi-tenant environment.

The operation of an illustrative embodiment of an information processing system will now be described in further detail with reference to the flow diagram of FIG. 2. The process as shown includes steps 200 through 206.

In step 200, containers are implemented for respective tenants of a multi-tenant environment on at least one container host device. The containers are assumed to be implemented on a single container host device. Such an arrangement was assumed for the containers 102 in the FIG. 1 embodiment. As mentioned previously, the containers 102 illustratively comprise Docker containers or other types of Linux containers. The containers 102 may be implemented at least in part utilizing a Docker daemon or other similar container generating program, possibly implemented within or in association with the container storage controller 120, although such a program is not explicitly illustrated in FIG. 1.

In step 202, portions of storage resources of a storage platform are provisioned for respective ones of the containers. The provisioned storage resources include for each of the containers at least one storage volume, such as the storage disks 106 provisioned for respective ones of the containers 102 by the container storage controller 120 in the FIG. 1 embodiment. Such storage resources are part of a storage platform comprising at least one storage array 114 as in the FIG. 1 embodiment.

In step 204, a condition is detected under which a process not associated with a given one of the containers attempts to access the storage volume provisioned for that container. Such a condition is detected in the FIG. 1 embodiment by the storage intrusion detector 125.

For example, as indicated previously, detection of the storage intrusion in some embodiments is based at least in part on intercepting system calls involving reading from or writing to the storage volume of a given container, and comparing an identifier of the given container to process identifiers associated with each of the intercepted system calls. The alert can then be generated if at least one of the process identifiers is inconsistent with the identifier of the given container. A process identifier in some embodiments is determined to be inconsistent with the identifier of the given container if a namespace identifier associated with the process identifier does not match a namespace identifier of the given container. Thus, the term "process identifier" as used herein is intended to be broadly construed, and may comprise, for example, a namespace identifier associated with a given process. Similarly, the term "container identifier" is also intended to be broadly construed, and may comprise, for example, a container namespace identifier or other type of container identifier.

In illustrative arrangements of this type, the namespace identifier of the given container represents a common "umbrella" under which all threads, forked processes, spawned processes or other processes executing in the container will be grouped. A thread or other process having a different namespace identifier than that of the given container is not under this umbrella and is assumed to lack authorization to access the storage volume provisioned to the given container. It is to be appreciated, however, that alternative techniques may be used in other systems disclosed herein to detect storage intrusions to storage volumes provisioned to respective containers in other embodiments.

Figure 2:
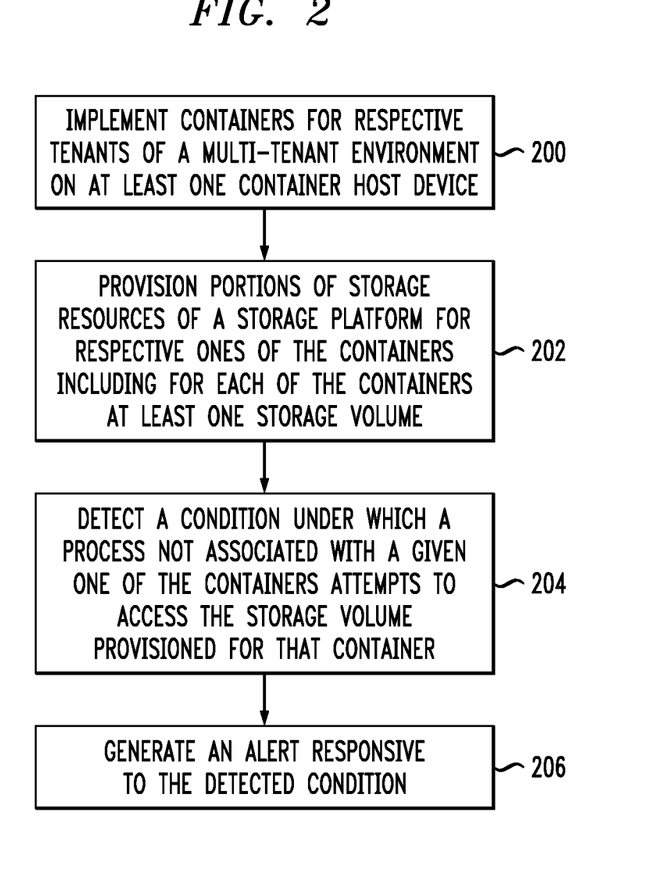
FIG. 2 is a flow diagram of a process for storage intrusion detection for storage resources provisioned to tenant containers in an illustrative embodiment.

The storage intrusion detection in step 204 of the FIG. 2 process advantageously ignores any reads, writes or other system call related I/O operations made by the containerized application, through its contained threads or other processes. These could include lightweight threads, process forks or processes created by a Docker daemon, using its advance command line options. The storage intrusion detection in this illustrative embodiment utilizes the unique container namespace identifier assigned by the Linux operating system to a given container in order determine if any processes outside of the umbrella of that container are attempting to access its provisioned storage volume.

In step 206, an alert is generated responsive to the detected condition. The alert may be generated, for example, by the storage intrusion detector 125 and provided to a component of the particular container having the storage volume that has experienced the detected storage intrusion. Additionally or alternatively, the alert can be provided to the tenant associated with that particular container. In some embodiments, the alert is generated by a system component other than the storage intrusion detector 125, such as the container storage controller 120. For example, the alert can be generated by the container storage controller 120 responsive to information provided to it by the storage intrusion detector 125. As indicated previously, the storage intrusion detector 125 can comprise a separate instance of intrusion detection functionality for each of the containers 102. Such instances can be activated separately for each of the containers 102. Thus, when multiple ones of the containers 102 are executing, some of them may have storage intrusion detection functionality enabled while others do not.

The particular processing operations and other system functionality described in conjunction with the flow diagram of FIG. 2 are presented by way of illustrative example only, and should not be construed as limiting the scope of the invention in any way. Alternative embodiments can use other types of processing operations to provide intrusion detection functionality for storage resources provisioned to tenant containers of a multi-tenant environment. For example, the ordering of the process steps may be varied in other embodiments, or certain steps may be performed concurrently with one another rather than serially. Also, one or more of the process steps may be repeated periodically for different processing scenarios, or performed in parallel with one another. For example, parallel instantiations of one or more of the process steps can be implemented for different containers of respective tenants within the system.

Storage intrusion detection functionality such as that described in conjunction with the flow diagram of FIG. 2 can be implemented at least in part in the form of one or more software programs stored in memory and executed by a processor of a processing device such as a computer or server. For example, the storage intrusion detector 125 is illustratively implemented as one or more software programs configured to run on underlying hardware of a container host device. As will be described below, a memory or other storage device having executable program code of one or more software programs embodied therein is an example of what is more generally referred to herein as a "processor-readable storage medium."

Additional illustrative embodiments of example information processing systems implementing storage intrusion detection functionality will now be described with reference to FIGS. 3 through 7.

Figure 3:
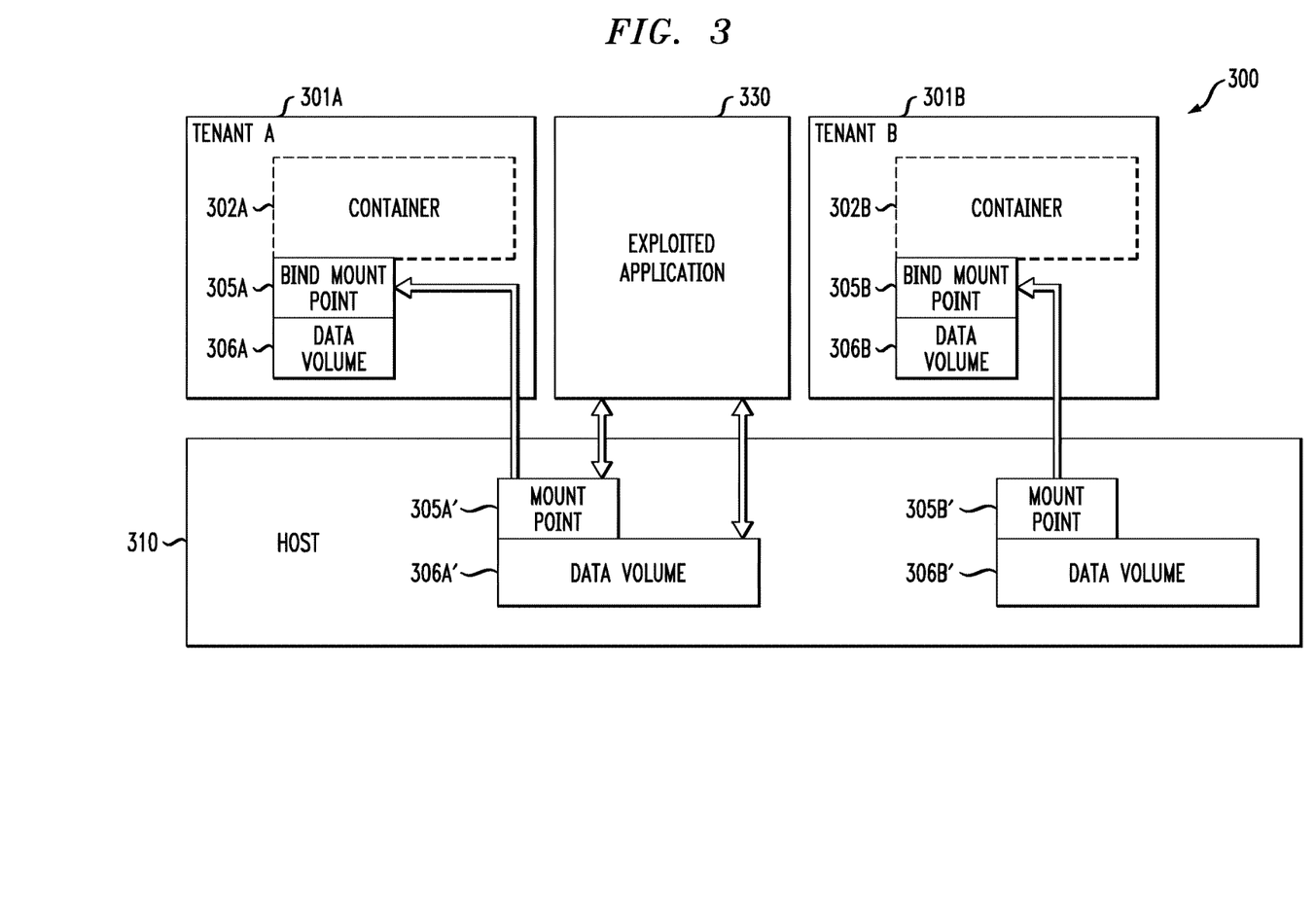
FIGS. 3 and 4 show one possible manner in which a storage intrusion detector can be utilized to detect and prevent unauthorized access to a tenant container storage volume by an exploited application in an illustrative embodiment.

Referring to FIG. 3, an information processing system 300 comprises first and second tenants 301A and 301B, also referred to as Tenant A and Tenant B, respectively. Associated with the first and second tenants 301A and 301B are respective containers 302A and 302B. Storage is provisioned to each of the containers 302A and 302B via bind mount points 305A and 305B to data volumes 306A and 306B. The storage may be initially provisioned to a container host device 310 from an associated storage platform and then connected to each container 302 upon startup of that container. Although not shown in the figure, a container storage controller may be used to connect the containers 302A and 302B with their respective data volumes 306A and 306B via the bind mount points 305A and 305B. The bind mount points 305A and 305B correspond to respective host mount points 305A' and 305B' that provide access to corresponding host data volumes 306A' and 306B' provisioned to the host 310 from the associated storage platform.

In the FIG. 3 embodiment, an additional application 330, which may run in a separate container not explicitly shown, is assumed to be exploited by an attacker. If the application 330 is executing with sufficiently high privileges on the host 310, it can result in the host data volume 306A' and the associated mount point 305A' being exposed to the attacker via the exploited application. Conventional container security arrangements are unable to adequately address such vulnerabilities.

Figure 4:
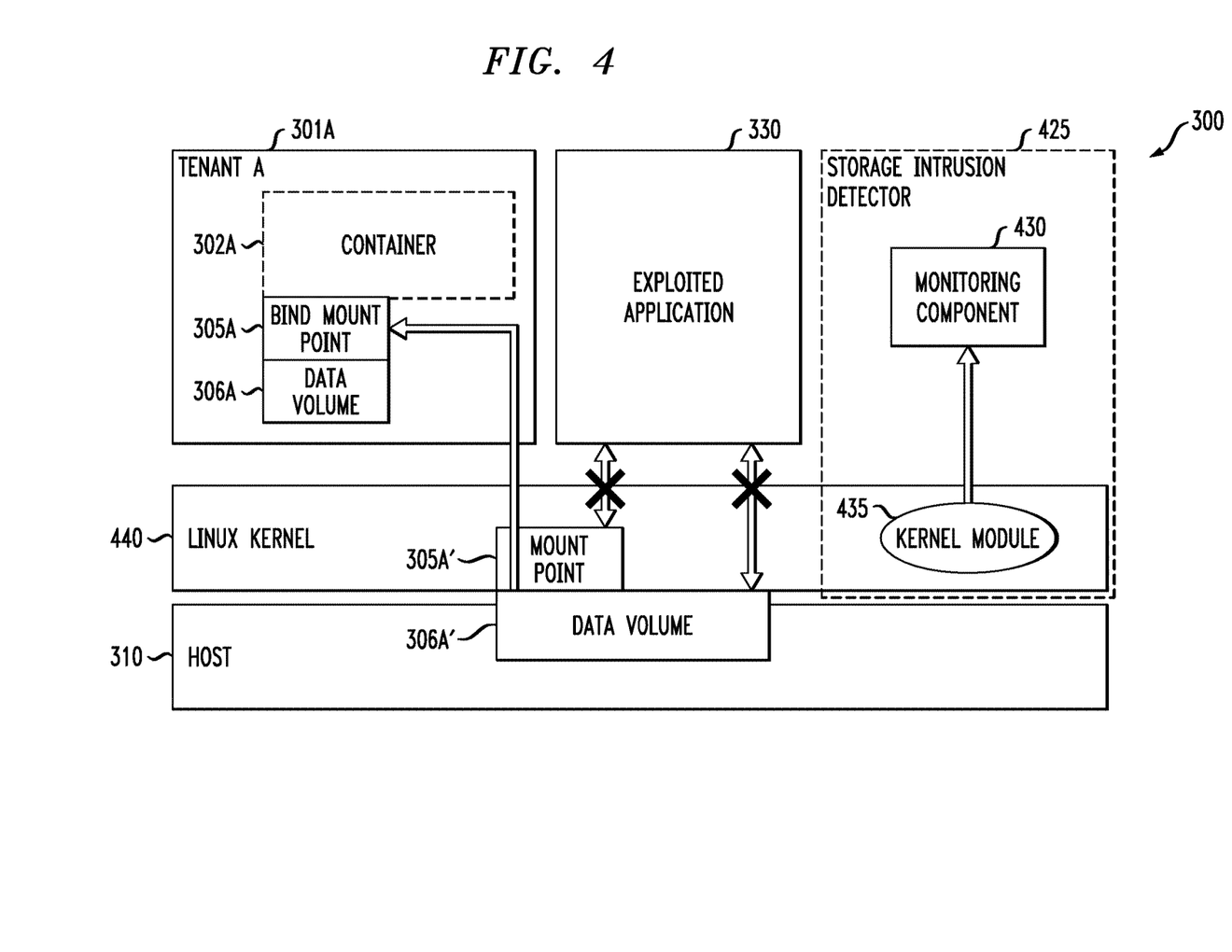

This potential vulnerability is addressed in the system 300 through the implementation of storage intrusion detection functionality as illustrated in FIG. 4. The storage intrusion detection functionality is implemented via a storage intrusion detector 425 that includes a monitoring component 430 coupled to a kernel module 435. The kernel module 435 is part of a Linux kernel 440. Although illustrated as separate from the host 310, the Linux kernel 440 is assumed to be part of an operating system of host 310. The kernel module 435 of the storage intrusion detector 425 is therefore implemented in kernel space of the operating system of the container host device. The monitoring component 430 of the storage intrusion detector 425 is assumed to be implemented in user space of the container host device operating system, although not explicitly illustrated in that configuration in the figure. In other embodiments, the storage intrusion detector 425 can be implemented with both the monitoring component 430 and the kernel module 435 being part of the Linux kernel 440.

The kernel module 435 is configured to detect storage intrusion into the data volumes 306A and 306B of the respective containers 302A and 302B by the exploited application 330 or other processes not associated with the respective containers. The kernel module 435 more particularly intercepts system calls involving reading from or writing to the data volumes 306A and 306B of the respective containers 302A and 302B, and for each of the containers compares an identifier of that container to process identifiers associated with each of the intercepted system calls directed to the corresponding data volume. An alert is generated by the monitoring component 430 if a process having a process identifier not associated with the container attempts to access the data volume provisioned to that container.

It should be noted that various actions can be taken responsive to generation of a storage intrusion detection alert. For example, as illustrated in FIG. 4, upon detection of an attempt by the exploited application 330 to access the data volume 306A provisioned to container 302A via bind mount point 305A, host mount point 305A' and host data volume 306A', the privileges or other characteristics of the exploited application 330 can be adjusted to ensure that the application can no longer make such access attempts. Numerous other types of actions can be taken to prevent storage intrusions by applications or associated processes responsive to generation of an alert in the system 300. In these and other embodiments, it is possible for such actions to be taken automatically upon detection of a storage intrusion without the generation of a corresponding alert. Thus, it is to be appreciated that alert generation is not a requirement of storage intrusion functionality as disclosed herein.

Figure 5:
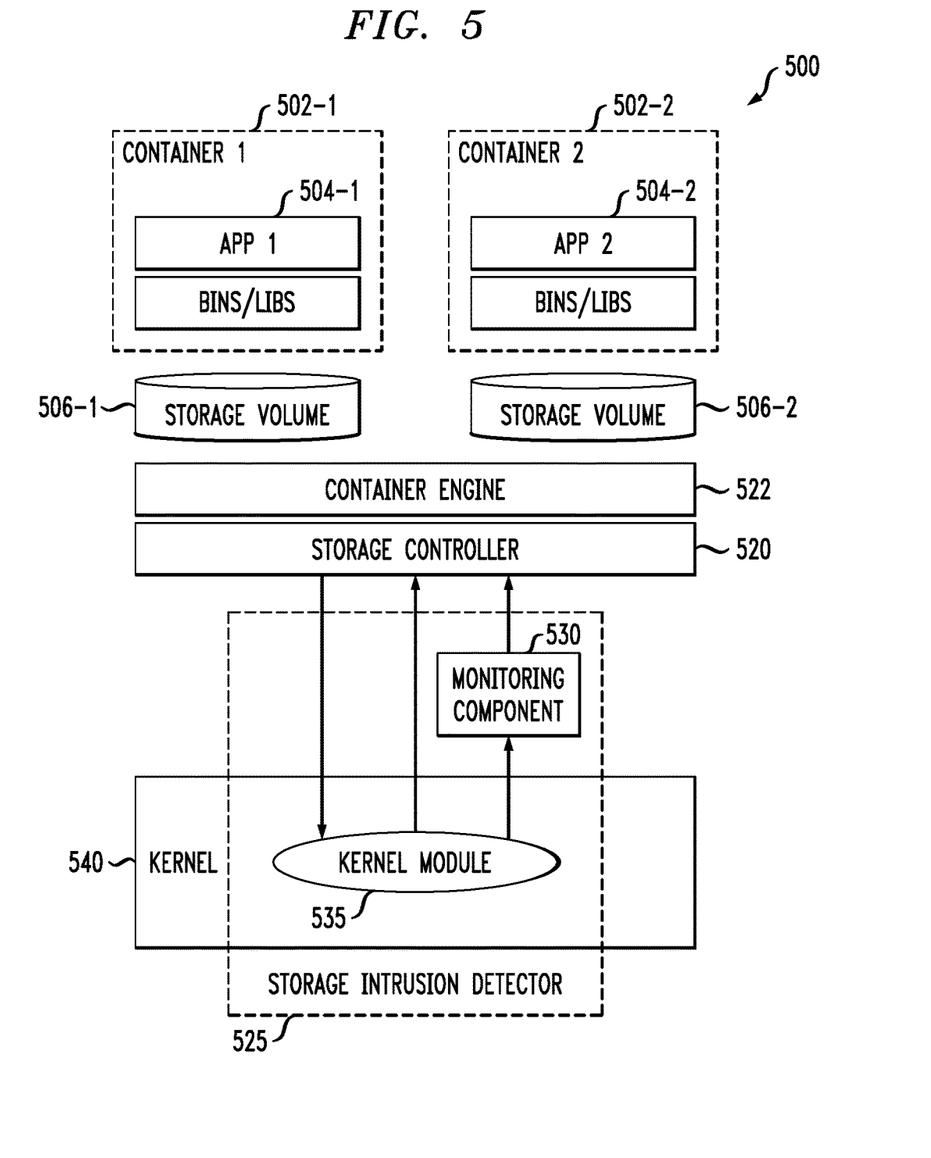
FIGS. 5, 6 and 7 illustrate information processing systems with storage intrusion detectors in other embodiments.

Another illustrative embodiment is shown in FIG. 5. An information processing system 500 comprises first and second containers 502-1 and 502-2, also respectively denoted as Container 1 and Container 2, in which respective applications 504-1 and 504-2 are running. The applications 504, also denoted App 1 and App 2, each include respective sets of binaries and libraries ("bins/libs"). The containers 502-1 and 502-2 have respective provisioned storage volumes 506-1 and 506-2 associated therewith. The storage volumes 506 are provisioned to the respective containers 502 by a storage controller 520. The containers 502 are configured, started, stopped and otherwise controlled by a container engine 522.

This embodiment further comprises a storage intrusion detector 525 that includes a monitoring component 530 and a kernel module 535 similar to those previously described in conjunction with FIG. 4. The kernel module 535 is implemented in a kernel 540 of an operating system of a container host device that supports the containers 502, applications 504, storage volumes 506, storage controller 520 and container engine 522. The kernel module 535 interacts with the storage controller 520 in conjunction with intercepting system calls generated by the applications 504 that involve reading from or writing to their respective provisioned storage volumes 506. The monitoring component 530 utilizes information provided to it by the kernel module 535 to identify an inconsistency between an identifier of a process attempting to access one of the storage volumes 506 and an identifier of the corresponding container. Such inconsistencies are indicative of storage intrusions and appropriate alerts are generated to the affected applications or their associated containers. As noted above, various other security actions may be taken in addition to or in place of alert generation.

Figure 6:
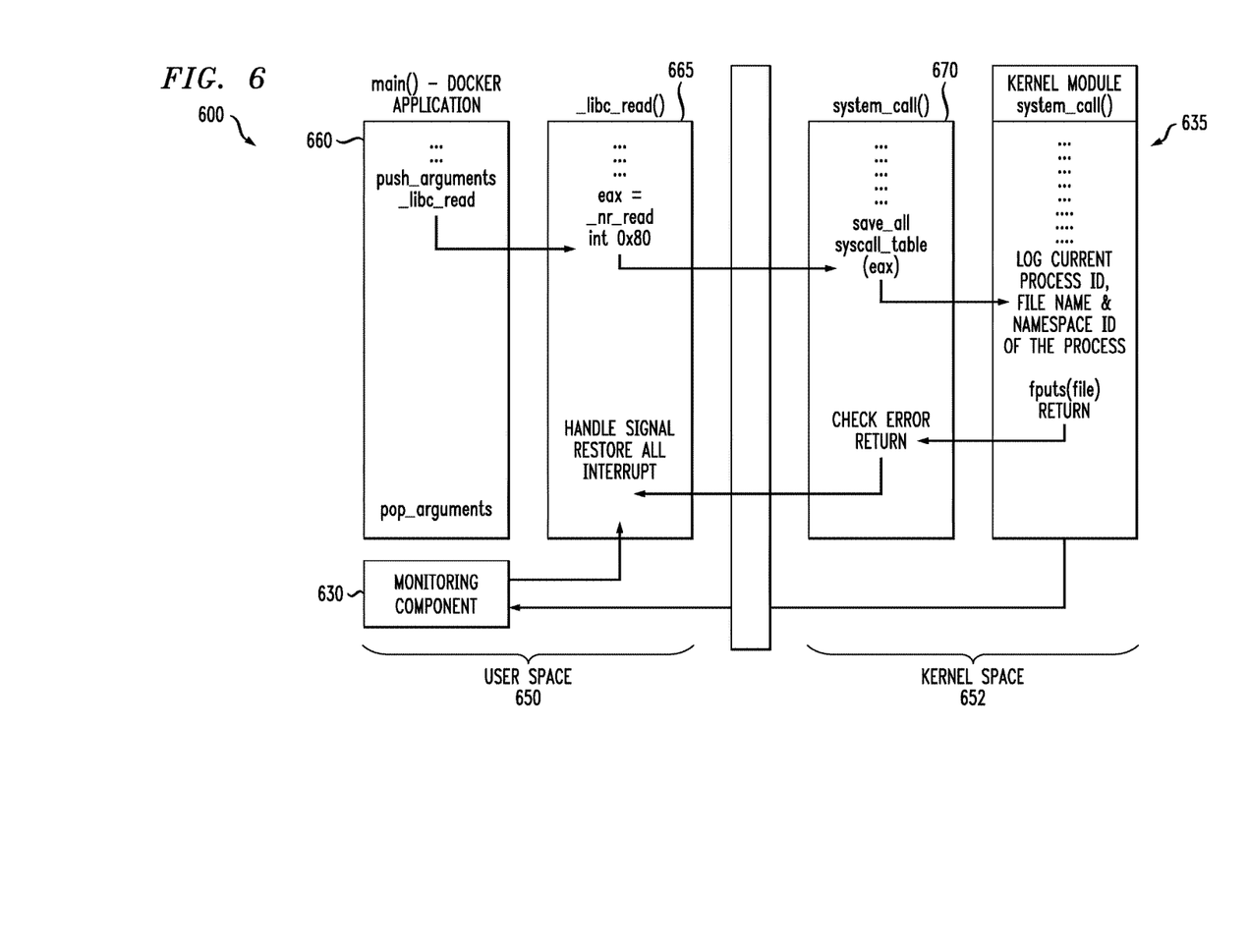

Referring now to FIG. 6, the operation of a storage intrusion detector implemented in an information processing system 600 is shown. The storage intrusion detector in this embodiment comprises a monitoring component 630 and a kernel module 635. The monitoring component 630 is implemented in user space 650 of an operating system of a container host device. The kernel module 635 is implemented in kernel space 652 of the container host device operating system. A Docker application 660 executes instructions in user space 650 some of which involve utilization of system interrupt generator 665. The generated interrupts result in system calls to a system call interface 670 implemented in the kernel space 652.

The kernel module 635 in this embodiment is configured to intercept system calls involving reading from or writing to the provisioned storage volume of the container in which the Docker application 660 is executing. For example, a C library ("clib") read function denoted _libc_read( ) is executed by pushing the corresponding instruction arguments ("push_arguments_libc_read") in a main( ) portion of the Docker application 660. A register ("eax") is configured to include the corresponding read command in association with a system call interrupt code ("int 0x80"). The system call is made from the user space 650 to the system call interface 670 in kernel space 652. The system call interface 670 stores the system calls originated via the eax register in a system call table.

Although shown as separate from the system call interface 670 in this embodiment, the kernel module 635 in other embodiments can be implemented at least in part within the system call interface 670.

The kernel module 635 intercepts the system calls and populates information relating to each of the intercepted system calls into a corresponding data structure that is made accessible to the monitoring component 630. The information relating to the intercepted system calls comprises a current process identifier ("process ID"), one or more file names and a namespace identifier ("namespace-id") of the process for each of the intercepted system calls.

An example of a C data structure that is populated by the kernel module 635 with information relating to a given intercepted system call is as follows:

typedef struct syscall_intercept_info{
char *pname; //The process name
pid_t pid; //The pid of the process
char *operation; //The operation performed by process on the file
char *path; //The file path
char *result; //The result of operations, pass or fail
char *details; //Any other details
unsigned int proc_inum; //the pid namespace id of the process
dev_t devid; //The device id (major & minor number) of the disk device
} syscall_intercept_info;

A separate populated instance of the above data structure may be generated by the kernel module 635 for each intercepted system call. In other embodiments, a single data structure can be populated with information from multiple intercepted system calls.

The resulting populated data structures can be made available by the kernel module 635 to the monitoring component 630 as they are generated by publishing those data structures into a netlink bus. Such a bus is illustratively configured to provide socket communication from the kernel space 652 to the user space 650. Other techniques can be used to provide intercepted system call information from the kernel module 635 to the monitoring component 630 in other embodiments.

The kernel module 635 executes an fputs( ) function and returns to the system call interface 670 as shown in the figure. From this point control returns to the system interrupt generator 665 in user space 650 with an indication that the interrupt has been handled. The associated arguments are then removed as shown ("pop_arguments").

The monitoring component 630 can be implemented as a watchdog program ("intrusion-watchdog") which is initiated with a parameter given by the name of the Docker container:
intrusion-watchdog <docker container name>

Accordingly, separate instances of the monitoring component 630 can be initiated for different containers running in the system 600. A single kernel module 635 can be common to and shared by such multiple instances of the monitoring component 630. Alternatively, separate instances of the kernel module 635 can be provided for each instance of the monitoring component 630.

For each container, the watchdog program implementation of the monitoring component 630 determines the processes running inside the container, the one or more storage volumes provisioned to the container and the namespace identifier of the container. The watchdog program compares this information with the information supplied to it by the kernel module 635 from intercepted system calls in order to identify processes unrelated to the container that are attempting to access its provisioned storage volumes. For example, the watchdog program can detect such a condition by comparing a namespace identifier of a process associated with an intercepted system call with a namespace identifier of the container. It generates an alarm if it detects that a process not belonging to the container namespace has attempted to perform a read, write, close or other I/O operation on a storage volume provisioned to that container, as determined by the namespace identifier of the process of the corresponding intercepted system call being different than the namespace identifier of the container.

Figure 7:
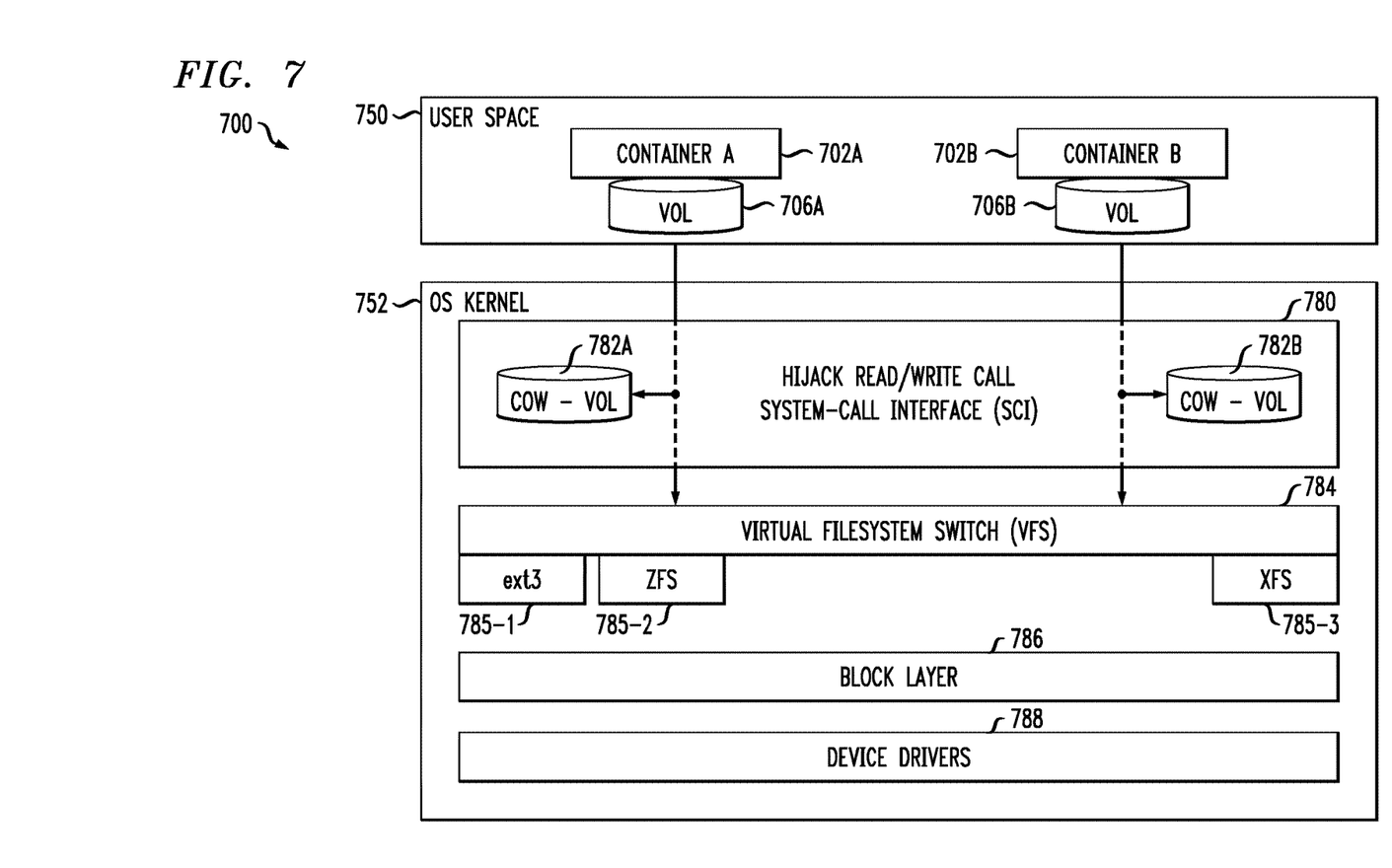

FIG. 7 shows another illustrative embodiment of an information processing system with storage intrusion detection functionality. An information processing system 700 includes a container host device that implements containers 702A and 702B with respective provisioned storage volumes 706A and 706B. The containers 702 and their associated storage volumes 706 are illustratively shown as being implemented as part of user space 750 of an operating system of the container host device. Kernel space 752 of the host container device operating system includes a system call interface ("SCI") 780 that includes a kernel module configured to intercept system calls generated by the respective containers 702. Information derived from the intercepted system calls is used to permit intrusion detection by a corresponding monitoring component that is not explicitly shown in this embodiment. The interception of a system call by the kernel module in this embodiment is also referred to as a "hijack" of the system call. Such a call may be permitted to execute or may be blocked from execution depending upon the type of call or other factors as appropriate to a given implementation.

In conjunction with the interception of the system calls, the kernel module of the system call interface 780 generates respective copy-on-write ("COW") volumes 782A and 782B corresponding to the respective provisioned storage volumes 706A and 706B. Such host-based COW snapshots provide a high-performance protection mechanism for container-specific data within the information processing system 700. This functionality may be implemented, for example, by introducing an appropriate filtering mechanism to separate data being written to an underlying shared disk or storage array into different portions associated with respective ones of the containers 702. Such a filtering mechanism may be introduced between a file I/O buffer and the shared disk or storage array. It provides an ability to copy the data associated with a given container into a corresponding COW storage volume, and may be implemented as part of or in association with the kernel module utilized to intercept system calls originating from the different containers 702.

The kernel space 752 of the container host device in the FIG. 7 embodiment further comprises a virtual file system switch ("VFS") 784 that provides access of the system call interface 780 to a plurality of different file systems including ext3, ZFS and XFS file systems 785-1, 785-2 and 785-3, respectively. The kernel space 752 also includes a block layer 786 and a plurality of device drivers 788.

It should again be noted that the particular arrangements of components in the systems of FIGS. 3 through 7, like those of the system 100 of FIG. 1, are presented by way of illustrative example only, and should not be construed as limiting in any way. As noted above, the described functionality can be implemented using additional or alternative components. Accordingly, a wide variety of different container storage controllers and storage intrusion detectors can be used in other embodiments.

The illustrative embodiments described above provide significant advantages over conventional arrangements.

For example, as some embodiments of the invention address storage isolation drawbacks of conventional Docker implementations, these embodiments make Docker containers more suitable for use in multi-tenant environments. However, the disclosed arrangements are also applicable to other types of LXCs or containers generally.

Embodiments of the invention are not limited to use with virtual storage volumes but are more generally applicable to any external storage volume or other storage volume that can be provisioned to a container.

Some embodiments can be configured to effectively prevent a malicious application executing in a given container from obtaining access to data not belonging to that application, such as data belonging to other applications running in containers of other tenants of a multi-tenant environment. In addition, this protection is provided in a manner that is highly flexible and easy to implement, and does not impede legitimate movement of data between containers. Moreover, storage intrusion detection in such embodiments does not limit portability or other movement of containers.

The storage intrusion detection functionality in some embodiments is not tightly coupled with particular operating system entities, processes or files. Accordingly, a given container can be brought down, moved with its volumes to a different host container, and scaled up or scaled out along with its volumes, without undermining the ability to implement effective storage intrusion detection functionality for that container. This functionality can be triggered automatically in conjunction with the starting of the container.

It should be understood that the particular sets of modules and other components implemented in the information processing systems as described above are presented by way of example only. In other embodiments, only subsets of these components, or additional or alternative sets of components, may be used, and such components may exhibit alternative functionality and configurations. For example, numerous alternative multi-tenant environments can be provided comprising multiple containers utilizing respective provisioned portions of underlying storage resources of a storage platform.

Also, the particular processing operations and other system functionality described in conjunction with the flow diagram of FIG. 2 are presented by way of illustrative example only, and should not be construed as limiting the scope of the invention in any way. Alternative embodiments can use other types of processing operations involving other information processing system components.

In some embodiments, storage intrusion detection functionality is implemented at least in part utilizing a container storage orchestration tool, although other embodiments need not utilize such tools.

It is to be appreciated that functionality such as that described in conjunction with the diagrams of FIGS. 1 through 7 can be implemented at least in part in the form of one or more software programs stored in memory and executed by a processor of a processing device such as a computer or server. A memory or other storage device having executable program code of one or more software programs embodied therein is an example of what is more generally referred to herein as a "processor-readable storage medium."

Communications between the various elements of an information processing system as disclosed herein may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally comprise other virtualization infrastructure such as virtual machines implemented using a hypervisor. Such cloud infrastructure can therefore be used to provide what is also referred to herein as a multi-tenant environment.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

The particular processing platforms described above are presented by way of example only, and a given information processing system such as system 100 may include additional or alternative processing platforms, as well as numerous distinct processing platforms in any combination, with each such platform comprising one or more computers, servers, storage devices or other processing devices.

Such information processing system components can communicate with other system components over any type of network or other communication media.

It should again be emphasized that the above-described embodiments of the invention are presented for purposes of illustration only. Many variations and other alternative embodiments may be used. For example, the disclosed techniques are applicable to a wide variety of other types of information processing systems, multi-tenant environments, containers, storage resources, and container storage controllers that can benefit from storage intrusion detection relating to provisioned storage resources of respective tenants. Also, the particular configurations of system and device elements shown in FIGS. 1 and 3-7 and the processing operations in FIG. 2 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   at least one container host device implementing containers for respective tenants of a multi-tenant environment;
   a storage platform coupled to the container host device and implementing storage resources for utilization by the containers;
   a container storage controller associated with the container host device; and
   a storage intrusion detector;
   wherein the containers are implemented utilizing operating system kernel control groups of the container host device;
   wherein the container storage controller is configured to provision portions of the storage resources for respective ones of the containers including for each of the containers at least one storage volume;
   wherein the storage intrusion detector is configured to detect a condition under which a process not associated with a given one of the containers attempts to access the storage volume provisioned for that container; and
   wherein an alert is generated responsive to the detected condition;
   the storage intrusion detector comprising:
   a monitoring component implemented in user space of an operating system of the container host device; and
   a kernel module implemented in kernel space of the operating system of the container host device;
   wherein the kernel module is configured to intercept system calls involving reading from or writing to the storage volume of the given container; and
   wherein the monitoring component is configured to compare an identifier of the given container to process identifiers associated with a plurality of intercepted system calls, and to generate the alert if at least one of the process identifiers is inconsistent with the identifier of the given container.

2. The apparatus of claim 1 wherein the container host device comprises at least one processor coupled to a memory and wherein at least a portion of one or more of the container storage controller and the storage intrusion detector is implemented by the processor executing software stored in the memory.

3. The apparatus of claim 1 wherein the storage platform comprises at least one of a storage fabric and a storage array.

4. The apparatus of claim 1 wherein the storage intrusion detector is implemented at least in part within the container storage controller.

5. The apparatus of claim 1 wherein the kernel module is implemented at least in part in a system call interface of the kernel space of the operating system of the container host device.

6. The apparatus of claim 1 wherein the kernel module is implemented externally to a system call interface of the kernel space of the operating system of the container host device.

7. The apparatus of claim 1 wherein the kernel module is configured to populate information relating to the intercepted system calls into one or more data structures that are made accessible to the monitoring component.

8. The apparatus of claim 7 wherein the information relating to the intercepted system calls comprises at least one of the process identifiers, one or more file names and a namespace identifier for each of the intercepted system calls.

9. The apparatus of claim 1 wherein the monitoring component determines if at least one of the process identifiers is inconsistent with the identifier of the given container by comparing a namespace identifier associated with the process identifier to a namespace identifier of the given container.

10. The apparatus of claim 1 wherein the container storage controller is implemented at least in part as an application running on the container host device.

11. The apparatus of claim 1 wherein the container storage controller is configured to control starting and stopping of the containers and wherein the storage intrusion detector is started for the given container in conjunction with the starting of that container by the container storage controller.

12. An information processing system comprising the apparatus of claim 1.

13. A method comprising:
   implementing containers for respective tenants of a multi-tenant environment on at least one container host device;
   provisioning portions of storage resources of a storage platform for respective ones of the containers including for each of the containers at least one storage volume;
   detecting in a storage intrusion detector a condition under which a process not associated with a given one of the containers attempts to access the storage volume provisioned for that container; and generating an alert responsive to the detected condition;

wherein the containers are implemented utilizing operating system kernel control groups of the container host device;

wherein the implementing, provisioning, detecting and generating are performed by at least one processing device comprising a processor coupled to a memory;

the storage intrusion detector comprising:

a monitoring component implemented in user space of an operating system of the container host device; and a kernel module implemented in kernel space of the operating system of the container host device;

wherein the kernel module is configured to intercept system calls involving reading from or writing to the storage volume of the given container; and wherein the monitoring component is configured to compare an identifier of the given container to process identifiers associated with a plurality of intercepted system calls, and to generate the alert if at least one of the process identifiers is inconsistent with the identifier of the given container.

14. The method of claim 13 further comprising providing the alert to the given container.

15. The method of claim 14 wherein at least one of the process identifiers is determined to be inconsistent with the identifier of the given container if a namespace identifier associated with the process identifier does not match a namespace identifier of the given container.

16. A non-transitory processor-readable storage medium having stored therein program code of one or more software programs, wherein the program code when executed by at least one processing device causes the processing device:

to implement containers for respective tenants of a multi-tenant environment on at least one container host device;

to provision portions of storage resources of a storage platform for respective ones of the containers including for each of the containers at least one storage volume;

to detect in a storage intrusion detector a condition under which a process not associated with a given one of the containers attempts to access the storage volume provisioned for that container; and to generate an alert responsive to the detected condition;

wherein the containers are implemented utilizing operating system kernel control groups of the container host device;

the storage intrusion detector comprising:

a monitoring component implemented in user space of an operating system of the container host device; and a kernel module implemented in kernel space of the operating system of the container host device;

wherein the kernel module is configured to intercept system calls involving reading from or writing to the storage volume of the given container; and wherein the monitoring component is configured to compare an identifier of the given container to process identifiers associated with a plurality of intercepted system calls, and to generate the alert if at least one of the process identifiers is inconsistent with the identifier of the given container.

17. The processor-readable storage medium of claim 16 wherein at least one of the process identifiers is determined to be inconsistent with the identifier of the given container if a namespace identifier associated with the process identifier does not match a namespace identifier of the given container.

18. The processor-readable storage medium of claim 16 wherein the kernel module is implemented at least in part in a system call interface of the kernel space of the operating system of the container host device.

19. The processor-readable storage medium of claim 16 wherein the kernel module is implemented externally to a system call interface of the kernel space of the operating system of the container host device.

20. The processor-readable storage medium of claim 16 wherein the kernel module is configured to populate information relating to the intercepted system calls into one or more data structures that are made accessible to the monitoring component.

* * * * *